United States Patent
Van Vuuren

(10) Patent No.: US 8,528,322 B2
(45) Date of Patent: Sep. 10, 2013

(54) REDUCTANT DELIVERY UNIT FOR SELECTIVE CATALYTIC REDUCTION WITH FREEZE ACCOMMODATION STRUCTURE

(75) Inventor: William Nicolaas Van Vuuren, Yorktown, VA (US)

(73) Assignee: Continental Automotive Systems US, Inc., Auburn Hills, MI (US)

(*) Notice: Subject to any disclaimer, the term of this patent is extended or adjusted under 35 U.S.C. 154(b) by 135 days.

(21) Appl. No.: 13/231,314

(22) Filed: Sep. 13, 2011

(65) Prior Publication Data

US 2013/0061578 A1 Mar. 14, 2013

(51) Int. Cl.
*F01N 3/00* (2006.01)

(52) U.S. Cl.
USPC .................. 60/286; 60/295; 60/303

(58) Field of Classification Search
USPC ........ 60/303, 286, 301, 274, 295; 137/15.01; 239/124–126, 533.2, 533.1, 584
See application file for complete search history.

(56) References Cited

U.S. PATENT DOCUMENTS

| 6,685,112 | B1 | 2/2004 | Hornby |
| 8,024,922 | B2 * | 9/2011 | van Vuuren et al. ............ 60/286 |
| 2008/0236147 | A1 | 10/2008 | Van Vuuren |

FOREIGN PATENT DOCUMENTS

| DE | 10200700538 A1 | 5/2008 |
| WO | 2012049175 A1 | 4/2012 |

OTHER PUBLICATIONS

Search Report and the Written Opinion of the International Search Authority, PCT/US2012/054586, Dec. 7, 2012.

* cited by examiner

*Primary Examiner* — Thomas E. Denion
*Assistant Examiner* — Kelsey Gambrel

(57) ABSTRACT

A reductant delivery unit (10') for selective catalytic reduction (SCR) after-treatment for vehicles includes a fluid injector (12) having a fluid inlet (24) and a fluid outlet (25) with the fluid inlet receiving a source of urea solution to be sent through the fluid outlet. Movable inlet cup structure (16') communicates with the inlet of the fluid injector. A shield (18') is fixed with respect to the fluid injector and surrounds at least portions of the fluid injector and the inlet cup structure. A spring (26) is engaged between a portion of the inlet cup structure and the shield. When the urea solution freezes in the fluid injector and expands near the fluid inlet of the injector, the inlet cup structure moves toward the injector inlet to accommodate the frozen urea solution, with the spring returning the inlet cup structure to an initial position once the frozen urea solution melts.

15 Claims, 2 Drawing Sheets

REDUCTANT DELIVERY UNIT FOR SELECTIVE CATALYTIC REDUCTION WITH FREEZE ACCOMMODATION STRUCTURE

FIELD OF THE INVENTION

The invention relates to a reductant delivery unit (RDU) that supplies reductant to an engine exhaust system and, more particularly, to an RDU that accommodates the expansion of urea ice upon freezing.

BACKGROUND OF THE INVENTION

The advent of a new round of stringent emissions legislation in Europe and North America is driving the implementation of new exhaust after-treatment systems, particularly for lean-burn technologies such as compression-ignition (diesel) engines, and stratified-charge spark-ignited engines (usually with direct injection) that are operating under lean and ultra-lean conditions. Lean-burn engines exhibit high levels of nitrogen oxide (NOx) emissions that are difficult to treat in oxygen-rich exhaust environments characteristic of lean-burn combustion. Exhaust after-treatment technologies are currently being developed that will treat NOx under these conditions. One of these technologies comprises a catalyst that facilitates the reactions of ammonia ($NH_3$) with the exhaust nitrogen oxides (NOx) to produce nitrogen ($N_2$) and water ($H_2O$). This technology is referred to as Selective Catalytic Reduction (SCR).

Ammonia is difficult to handle in its pure form in the automotive environment. Therefore, it is customary with these systems to use a liquid aqueous urea solution, typically at a 32% concentration of urea solution ($CO(NH_2)_2$). The solution is referred to as AUS-32, and is also known under its commercial name of AdBlue. The urea solution is delivered to the hot exhaust stream and is transformed into ammonia in the exhaust after undergoing thermolysis, or thermal decomposition, into ammonia and isocyanic acid (HNCO). The isocyanic acid then undergoes a hydrolysis with the water present in the exhaust and is transformed into ammonia and carbon dioxide ($CO_2$). The ammonia resulting from the thermolysis and the hydrolysis then undergoes a catalyzed reaction with the nitrogen oxides as described previously.

The freezing point of AUS-32 or AdBlue is −11 C. An alternative reductant carrier under development, known commercially as Denoxium, has a freezing point of −30 C. In the case of both fluids, it is expected that system freezing will occur in cold climates. Since these fluids are aqueous, a volume expansion occurs after the transition to the solid state (ice). This expanding ice can exert significant forces on any enclosed volumes, such as an injection or fluid supply pipes. In conventional SCR systems, fluid is evacuated from the system and the RDU at engine shutdown to avoid localized freezing of the fluid in the injection unit. However, some urea solution ice may form in the unit. For example, with reference to FIG. 1, RDU, generally indicated at 10, comprises a fluid injector 12 welded to an interior carrier 14. An inlet cup structure 16 is fixed to a shield 18. These two assemblies are crimped together by folding down tangs of the flange 20 over shelf features of the carrier 14 and shield 18. As a result, the entire assembly is fixed together, within the strength constraints of the crimp and the shield-to-cup structure fixation.

In the event that urea solution ice forms within the unit, it will tend to expand out the inlet of the injector 12. The ice then exerts a force on the inlet cup structure 16. The reactive force is exerted on the internal injector components such as the filter and adjusting tube of the injector 12. If the adjusting tube is moved by this force, or otherwise damaged, the injector will no longer permit fluid flow at the correct calibrated value, resulting in a system malfunction. Other internal damage can occur, for example, deformation of the injector 12, leading to the armature sticking open, which also results in system malfunction.

Thus, there is also a need to allow an RDU to accommodate the expansion of urea solution ice upon freezing.

SUMMARY OF THE INVENTION

An object of the invention is to fulfill the needs referred to above. In accordance with the principles of the present invention, this objective is obtained by providing a reductant delivery unit for selective catalytic reduction (SCR) after-treatment for vehicles. The reductant delivery unit includes a fluid injector constructed and arranged to be associated with an exhaust gas flow path upstream of a SCR catalytic converter. The fluid injector has a fluid inlet and a fluid outlet. The fluid inlet is constructed and arranged to receive a source of urea solution and the fluid outlet being constructed and arranged to communicate with the exhaust flow path so as to control injection of urea solution into the exhaust gas flow path. Movable inlet cup structure is in fluid communication with the fluid inlet of the fluid injector. A shield is fixed with respect to the fluid injector and surrounds at least portions of the fluid injector and the inlet cup structure. A spring is engaged between a portion of the inlet cup structure and the shield. When the urea solution freezes in the fluid injector and expands near the fluid inlet of the injector, the inlet cup structure is constructed and arranged to move towards the injector inlet, against the bias of the spring, to accommodate the frozen urea solution, with the spring returning the inlet cup structure to an initial position once the frozen urea solution melts.

In accordance with another aspect of a disclosed embodiment, a method of accommodating freezing urea solution in a reductant delivery unit for selective catalytic reduction (SCR) after-treatment for vehicles provides the reductant delivery unit to have a fluid injector constructed and arranged to be associated with an exhaust gas flow path upstream of a SCR catalytic converter. The fluid injector has a fluid inlet and a fluid outlet. The fluid inlet is constructed and arranged to receive a source of urea solution and the fluid outlet being constructed and arranged to communicate with the exhaust flow path so as to control injection of urea solution into the exhaust gas flow path. The unit also includes an inlet cup structure in fluid communication with the fluid inlet of the fluid injector. When the urea solution freezes in the fluid injector and expands near the fluid inlet of the injector, the inlet cup structure is permitted to move towards the injector inlet to accommodate the frozen urea solution.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF THE EXEMPLARY EMBODIMENTS

Figure 2:
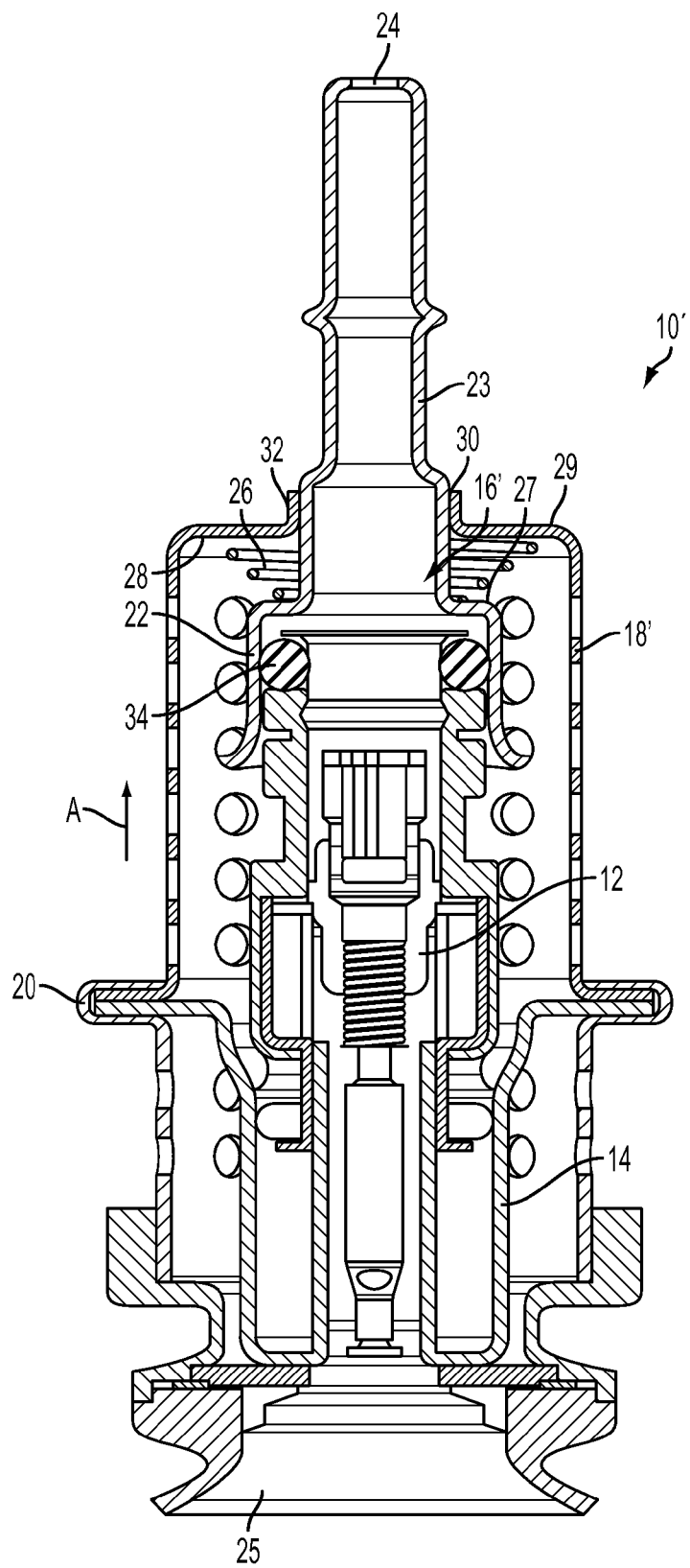
FIG. 2 is a view of an RDU provided in accordance with an embodiment, shown with freeze accommodation structure.

With reference to FIG. 2, an RDU is shown, generally indicated at 10', in accordance with an embodiment of the invention. The RDU 10' can be employed in a system of the type disclosed in U.S. Patent Application Publication No. 2008/0236147 A1, the contents of which is hereby incorporated by reference into this specification.

The RDU 10' includes a solenoid fluid injector 12 that provides a metering function of fluid and provides the spray preparation of the fluid into the exhaust path of a vehicle in a dosing application. Thus, the fluid injector 12 is constructed and arranged to be associated with an exhaust gas flow path upstream of a SCR catalytic converter. The fluid injector 12 is preferably a gasoline, electrically operated, solenoid fuel injector such as the type disclosed in U.S. Pat. No. 6,685,112, the content of which is hereby incorporated by reference into this specification.

The fluid injector 12 is welded to an interior carrier 14. An inlet cup structure, generally indicated at 16', includes a cup 22 and an inlet tube 23 integral with the cup 22. The cup structure 16' is in fluid communication with an inlet 24 of the injector 12 and is mounted for movement. The inlet tube 23 is in communication with a source of urea solution (not shown) that is fed to the injector 12 to be injected from an outlet 25 of the injector 12. An injector shield 18' is coupled to the injector carrier 14 by a folding down tangs of a flange 20 over shelf features of the carrier 14 and the shield 18'. Thus, the shield 18' is fixed with respect to the injector 12.

Figure 1:
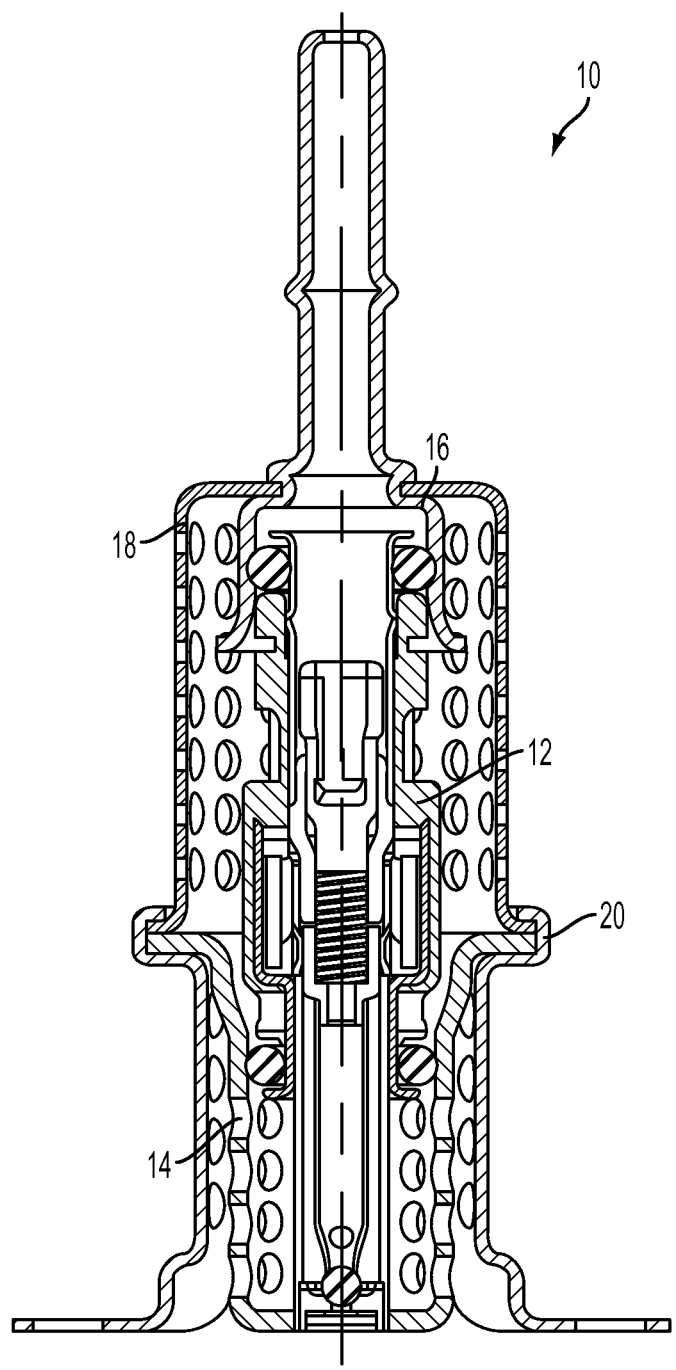
FIG. 1 is a view of a conventional RDU.

As an alternative to purging fluid as in the conventional RDU mentioned above, fluid could be left in the RDU 10' at shutdown, thereby eliminating the need for a purging operation. In order to prevent damage to the RDU 10' upon freezing of the urea solution, in accordance with the embodiment, a spring 26 is engaged between an outer surface 27 of the cup 22 and an inner surface 28 of the injector shield 18'. The spring 26 is preferably a compression conical coil spring. The shield 18' surrounds the cup 22 and at least a portion of the injector 12 and isolates these components from the excessive heat of the vehicle's exhaust. The shield 18' includes a flange portion 29 which defines the inner surface 28 that faces the outer surface 27 of the cup 22. The inlet tube 23 includes an integral guide portion 30 in the form of an enlarged tube disposed adjacent to the cup 22. The shield 18' includes a hollow, cylindrical guide receiving portion 32 having open ends. The guide receiving portion 32 surrounds a portion of a periphery of the guide portion 30 so that the guide receiving portion 32 guides vertical movement of the inlet cup structure 16' with respect to the shield 18', as will be explained more fully below. Thus, unlike the RDU 10 of FIG. 1, the RDU 10' of the embodiment removes the fixation between the inlet cup structure 16' and the shield 18'.

As the urea solution freezes and exerts forces on the cup 22 in the direction of arrow A, the cup 22 is permitted to move towards the injector inlet 24 and against the bias of the spring 26, with the spring 26 being progressively compressed. The movement of the cup 22 is guided by the guide portion 30 sliding in the guide receiving portion 32 of the shield 18'. The expected amount of upward movement of the cup 22 is a function of the volume of fluid in the injector 12. The spring 26 is sized to accommodate this maximum displacement. The force of the spring 26 at this maximum displacement is then sized to provide sufficient force to overcome any friction resistance supplied by the injector O-ring 34 and cup 22 interface. Thus, the cup 22 is returned to the initial position by the spring 26 when the fluid melts and the ice force is removed.

It can be appreciated that the spring 26 and movable inlet cup structure 16' accommodates any freezing of fluid in the injector 12 of an RDU.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A reductant delivery unit for selective catalytic reduction (SCR) after-treatment for vehicles, the reductant delivery unit comprising:
   a fluid injector constructed and arranged to be associated with an exhaust gas flow path upstream of a SCR catalytic converter, the fluid injector having a fluid inlet and a fluid outlet, the fluid inlet being constructed and arranged to receive a source of urea solution and the fluid outlet being constructed and arranged to communicate with the exhaust flow path so as to control injection of the urea solution into the exhaust gas flow path,
   inlet cup structure in fluid communication with the fluid inlet of the fluid injector, the inlet cup structure being mounted for movement,
   a shield fixed with respect to the fluid injector and surrounding at least portions of the fluid injector and the inlet cup structure, and
   a spring engaged between a portion of the inlet cup structure and the shield,
   wherein, when the urea solution freezes in the fluid injector and expands near the fluid inlet of the injector, the inlet cup structure is constructed and arranged to move towards the injector inlet, against the bias of the spring, to accommodate the frozen urea solution, with the spring returning the inlet cup structure to an initial position once the frozen urea solution melts.

2. The unit of claim 1, wherein the inlet cup structure comprises a cup and an inlet tube integral with the cup, the cup having an outer surface defining the portion of the inlet cup structure engaged by the spring.

3. The unit of claim 2, wherein the shield has a flange portion defining an inner surface facing the outer surface of the cup, the inner surface being engaged by the spring.

4. The unit of claim 2, further comprising an O-ring between the cup and the fluid injector, the spring being constructed and arranged to provide a force sufficient to overcome frictional resistance between an interface of the O-ring and cup to return the inlet cup structure to an initial position once the frozen urea solution melts.

5. The unit of claim 1, wherein the spring is a compression coil spring.

6. The unit of claim 5, wherein the spring is a conical coil spring.

7. The unit of claim 2, wherein the inlet tube includes a guide portion adjacent to the cup and the shield includes a guide receiving portion surrounding a portion of the guide portion so as to guide the movement of the inlet cup structure.

8. The unit of claim 7, wherein the guide receiving portion is in the form of a hollow cylinder with open ends, the guide portion being in the form of a tube received for movement in the hollow cylinder.

9. A reductant delivery unit for selective catalytic reduction (SCR) after-treatment for vehicles, the reductant delivery unit comprising:

a fluid injector constructed and arranged to be associated with an exhaust gas flow path upstream of a SCR catalytic converter, the fluid injector having a fluid inlet and a fluid outlet, the fluid inlet being constructed and arranged to receive a source of urea solution and the fluid outlet being constructed and arranged to communicate with the exhaust flow path so as to control injection of the urea solution into the exhaust gas flow path, inlet cup structure in fluid communication with the fluid inlet of the fluid injector, the inlet cup structure being mounted for movement, a shield fixed with respect to the fluid injector and surrounding at least portions of the fluid injector and the inlet cup structure, and means for biasing the inlet cup structure, wherein, when the urea solution freezes in the fluid injector and expands near the fluid inlet of the injector, the inlet cup structure is constructed and arranged to move towards the injector inlet, against the bias of the means for biasing, to accommodate the frozen urea solution, with the means for biasing returning the inlet cup structure to an initial position once the frozen urea solution melts.

10. The unit of claim 9, wherein the means for biasing is a compression coil spring engaged between a portion of the inlet cup structure and the shield.

11. The unit of claim 10, wherein the spring is a conical coil spring.

12. The unit of claim 10, wherein the inlet cup structure comprises a cup and an inlet tube integral with the cup, the cup having an outer surface defining the portion of the inlet cup structure engaged by the spring and wherein the shield has a flange portion defining an inner surface facing the outer surface of the cup, the inner surface being engaged by the spring.

13. The unit of claim 12, further comprising an O-ring between the cup and the fluid injector, the spring being constructed and arranged to provide a force sufficient to overcome frictional resistance between an interface of the O-ring and cup to return the inlet cup structure to an initial position once the frozen urea solution melts.

14. The unit of claim 12, wherein the inlet tube includes a guide portion adjacent to the cup and the shield includes a guide receiving portion surrounding a portion of the guide portion so as to guide the movement of the inlet cup structure.

15. The unit of claim 14, wherein the guide receiving portion is in the form of a hollow cylinder with open ends, the guide portion being in the form of a tube received for movement in the hollow cylinder.

* * * * *